(12) United States Patent
Iasso (10) Patent No.: US 8,218,828 B2
(45) Date of Patent: Jul. 10, 2012

(54) SYSTEMS AND METHODS FOR BIOMETRIC INFORMATION AUTOMATION

(75) Inventor: Anthony S. Iasso, Haymarket, VA (US)

(73) Assignee: Anthony S. Iasso, Haymarket, VA (US)

( * ) Notice: Subject to any disclaimer, the term of this patent is extended or adjusted under 35 U.S.C. 154(b) by 1137 days.

(21) Appl. No.: 11/966,333

(22) Filed: Dec. 28, 2007

(65) Prior Publication Data

US 2008/0159598 A1 Jul. 3, 2008

Related U.S. Application Data

(60) Provisional application No. 60/877,609, filed on Dec. 29, 2006.

(51) Int. Cl.
*G06K 9/00* (2006.01)
*H04Q 9/00* (2006.01)
*G06F 21/00* (2006.01)

(52) U.S. Cl. ........ 382/115; 382/116; 382/118; 382/209; 340/5.53; 713/186

(58) Field of Classification Search .................. 382/115, 382/124–127, 100, 118, 116, 312, 181, 209; 235/380, 382, 382.5; 902/3–6; 713/182, 713/186; 340/5.21, 5.52, 5.53, 5.8, 5.81, 340/5.82, 5.83
See application file for complete search history.

(56) References Cited

U.S. PATENT DOCUMENTS

| | | | |
|---|---|---|---|
| 6,498,861 B1 * | 12/2002 | Hamid et al. | 382/124 |
| 6,505,193 B1 * | 1/2003 | Musgrave et al. | 1/1 |
| 6,944,318 B1 * | 9/2005 | Takata et al. | 382/115 |
| 7,474,769 B1 * | 1/2009 | McAfee et al. | 382/115 |
| 7,797,549 B2 * | 9/2010 | Main et al. | 713/186 |
| 7,804,982 B2 * | 9/2010 | Howard et al. | 382/115 |

* cited by examiner

*Primary Examiner* — Sheela Chawan
(74) *Attorney, Agent, or Firm* — The Fletcher Law Firm PLLC; Brian N. Fletcher (57) ABSTRACT

A method identifies persons based on biometric information. The method includes providing a cache of biometric templates. The cache stores segments of the biometric templates associated with biometric features contained in the segments. The method also includes receiving a sample biometric template to be identified; dividing the sample biometric template into jobs based on the biometric features contained in the sample biometric template; comparing the jobs to the segments corresponding to the biometric features of the sample biometric template to determine candidate biometric templates associated with the segments that match the jobs; and generating a candidates list identifying the candidate biometric templates and entities related to the candidate biometric templates.

21 Claims, 10 Drawing Sheets

SYSTEMS AND METHODS FOR BIOMETRIC INFORMATION AUTOMATION

CROSS REFERENCE TO RELATED APPLICATIONS

This application claims priority to U.S. Provisional Patent Application Ser. No. 60/877,609 filed on Dec. 29, 2006, the disclosure of which is incorporated in its entirety by reference herein.

GOVERNMENT INTEREST

The development of this invention was supported, in part, by the Department of the Army under contract number: GS-35F-0885N, Task Order GST0904DF7064. The United States Government may have certain rights in this invention pursuant.

FIELD

This invention relates generally to biometric systems and methods.

BACKGROUND

Biometric authentication and biometric identification have become important processes for identifying and verifying the identity of a person. Biometric authentication and biometric identification include automated methods of recognizing a person based on a physiological or behavioral characteristic. Among the features measured are face, fingerprints, hand geometry, handwriting, iris, hand geometry, gait, DNA, retinal, vein, and voice.

Biometric authentication and biometric identification are becoming the foundation of an extensive array of highly secure identification and personal verification systems. As the level of security breaches and transaction fraud increases, the need for highly secure identification and personal verification technologies is becoming apparent. Biometric authentication is being utilized in a wide array of settings such as enterprise-wide network security infrastructures, government IDs, secure electronic banking, investing and other financial transactions, retail sales, law enforcement, and health and social services.

Biometric authentication and identification involve the comparison of a sample template and one or more stored templates. A template may be a synthesis of all the characteristics extracted from the source, in the optimal size to allow for adequate identifiability. Biometric authentication typically involves the use of a credential (a badge, a submitted name, etc.) and results in a 1 to 1 match. The subject's biometric template is retrieved via a lookup using the credential, and a biometric matching occurs between a sample template and the retrieved template. Biometric identification typically involves receiving a sample template without a credential. In biometric identification, exhaustive matching (1 to n) is performed to identify the candidate from a database of templates without having a credential to narrow possible candidates.

However, in typical biometrics identification, the stored templates can be numerous. As such, the template comparison can take a significant amount of time as each stored template is retrieved and compared. Thus, there is a need in the art for a mechanism to provide streamlined and efficient biometrics identification and biometrics authentication.

SUMMARY

An embodiment is directed to a method of identifying persons based on biometric information. The method includes providing a cache of biometric templates. The cache stores segments of the biometric templates associated with biometric features contained in the segments. The method also includes receiving a sample biometric template to be identified; dividing the sample biometric template into jobs based on the biometric features contained in the sample biometric template; comparing the jobs to the segments corresponding to the biometric features of the sample biometric template to determine candidate biometric templates associated with the segments that match the jobs; and generating a candidates list identifying the candidate biometric templates and entities related to the candidate biometric templates.

Another embodiment is directed to an apparatus for identifying persons based on biometric information. The apparatus includes a cache configured to store biometric templates. The cache stores segments of the biometric templates associated with biometric features contained in the segments. The apparatus also includes an interface configured to receive a sample biometric template to be identified; and a jobs thread coupled to the interface. The jobs thread is configured to divide the sample biometric template into jobs based on the biometric features contained in the sample biometric template. The apparatus also includes a matchers thread coupled to the jobs thread. The matchers thread is configured to compare the jobs to the segments corresponding to the biometric features of the sample biometric template to determine candidate biometric templates associated with the segments that match the jobs and configured to generate a candidates list identifying the candidate biometric templates and entities related to the candidate biometric templates.

Another embodiment is directed to a system for identifying persons based on biometric information. The system includes a server configured to receive a sample biometric template to be identified over a network and a database coupled to the server. The database is configured to store biometric templates. The system also includes a biometric engine coupled to the server and database for identifying and managing the biometric information. The biometric engine includes a cache configured to store segments of the biometric templates associated with biometric features contained in the segments; an interface configured to receive the sample biometric template from the server; and a jobs thread coupled to the interface. The jobs thread is configured to divide the sample biometric template into jobs based on the biometric features contained in the sample biometric template. The biometric engine also includes a matchers thread coupled to the jobs thread. The matchers thread is configured to compare the jobs to the segments corresponding to the biometric features of the sample biometric template to determine candidate biometric templates associated with the segments that match the jobs and configured to generate a candidates list identifying the candidate biometric templates and entities related to the candidate biometric templates.

Additional embodiments will be set forth in part in the description which follows, and in part will be obvious from the description, or may be learned by practice of the embodiments. Embodiments will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the present disclosure and together with the description, serve to explain the embodiments.

DETAILED DESCRIPTION

Embodiments of the present disclosure are directed to a Biometrics Automated Toolset (BAT) and a system implementing BAT. The BAT allows wide scale capture of biometric information, storage of biometric information, transmission of biometric information, and high-speed, streamlined match processing of the biometric information. The BAT can be implemented in a client-server hierarchy in an entity identification and tracking system either on a stand-alone computing platform or in a multiple computer networked architecture. As such, single or multiple computer systems can capture, process, and share biometric information.

The BAT in the client-server hierarchy includes an UltraEngine. The UltraEngine receives and processes all types of biometric information. Thus, the UltraEngine consolidates multiple types of biometric information processing in a pluggable framework in lieu of a separate application for each type of information such as fingerprint, iris, facial, voice, vein, hand geometry, gait, DNA, or handwriting.

The UltraEngine contains an internal caching mechanism called the UltraCache. The UltraCache caches biometric templates from the BAT database for rapid retrieval and biometric matching. Further, the UltraEngine streamlines the request for biometric matching in order to reduce processing time for matching.

Reference will now be made in detail to the exemplary embodiments of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration specific exemplary embodiments. These embodiments are described in sufficient detail to enable those skilled in the art to practice the embodiments and it is to be understood that other embodiments can be used and that changes can be made without departing from the scope of this disclosure. The following description is, therefore, merely exemplary.

Figure 1:
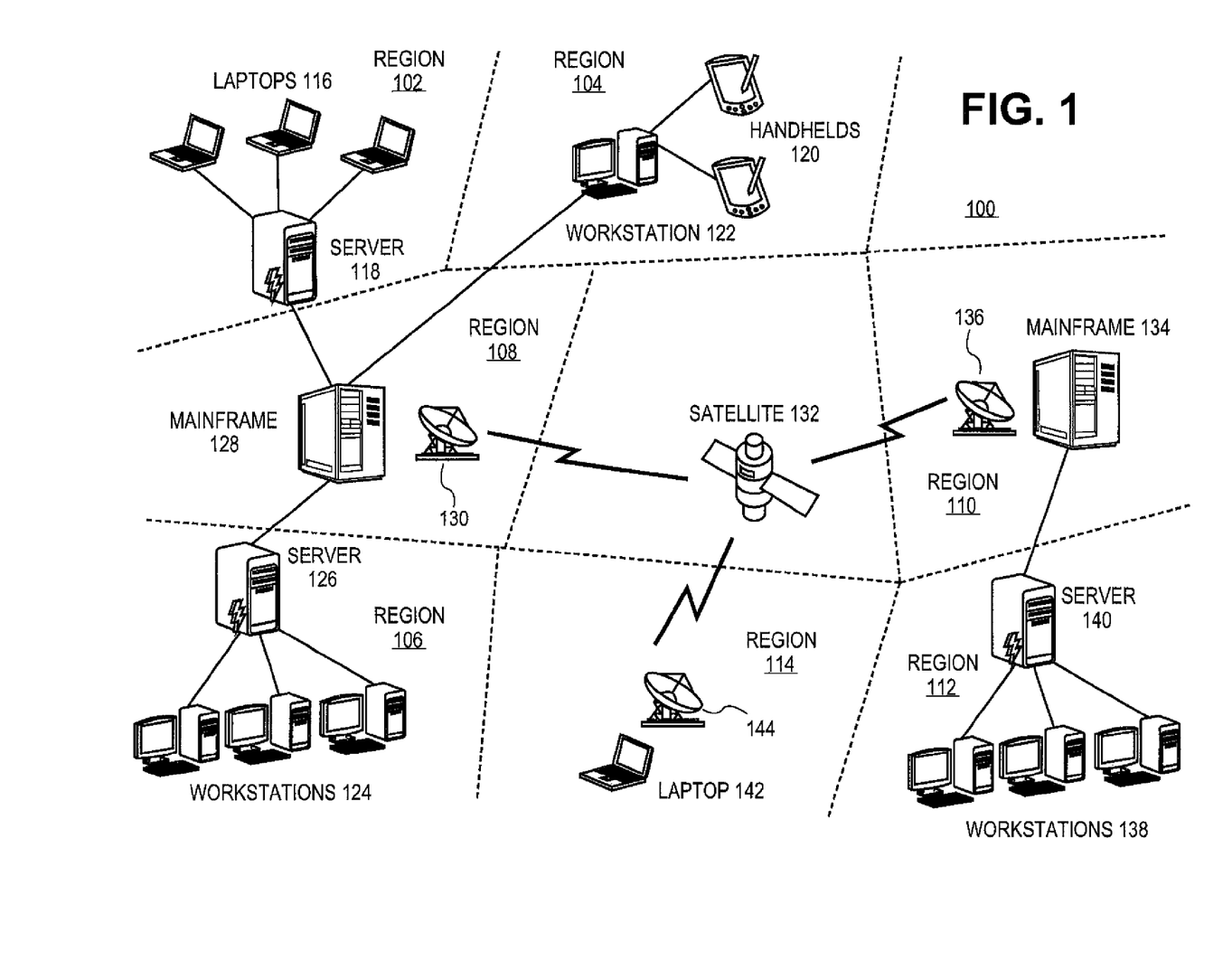
FIG. 1 is a diagram illustrating an entity identification and tracking system using a Biometrics Automation Toolset (BAT).

The Biometrics Automated Toolset (BAT) allows wide scale capture of biometric information and high-speed, streamlined processing of the biometric information. FIG. 1 is a diagram illustrating an entity identification and tracking system 100 implementing BAT consistent with embodiments of the disclosure. The system includes multiple computing systems located in various geographic regions. Each computing system in system 100 implements an instance of BAT. Each of the computing systems capture biometric information from entities and use BAT to process and share the biometric information.

As illustrated in FIG. 1, the computing systems can be located in seven different geographic regions: Region 102, Region 104, Region 106, Region 108, Region 110, Region 112, and Region 114. The geographic regions can be located at any place in the world. For example, the geographic regions can be located in a single city. Furthermore, the geographic regions can be spread out over the entire globe with multiple regions located in different countries or on different continents. One skilled in the art will realize that the geographic regions and computing systems illustrated in FIG. 1 are exemplary and that system 100 can include any number of computing systems located in any number of geographic regions.

As shown, Region 102 can include several laptop computing systems 116 networked to a server computing system 118. Region 104 can include several handheld computing systems 120 networked to a workstation computing system 122. Region 106 can include several workstation computing systems 124 networked to a server computing system 126. Region 108 can include a mainframe computing system 128 networked to the computing systems in Regions 102, 104, and 106. Region 108 can include a satellite uplink 130 to transmit information to other regions via satellite 132.

Region 110 can include another mainframe computing system 134 networked to the computer systems in Region 112 and can include a satellite uplink 136 to transmit information to other regions, such as Regions 102, 104, 106, and 108 via satellite 132. Region 112 can include several workstation computing systems 138 networked to a server computing system 140. Region 114 can include a laptop computing system 142 and a satellite uplink 144 to communicate to other geographic regions via satellite 132.

The computing systems can communicate with one another via any type of communication channel and protocol. For example, the computing systems in a particular geographic region can be networked in a LAN configuration. Further, all the computing systems in system 100 can be networked in a WAN configuration. The computing systems can communicate via any type of communication channel such wired, satellite, cellular, radio frequencies including WiFi (802.11a, b, g, n), or any other current or future wired or wireless protocols.

System 100 allows the capture, processing, and sharing of biometric information from entities. The biometric information allows system 100 to identify, classify, and track the entities that come in contact with system 100. In order to identify, classify, and track the entities, the computing systems of the geographic regions can implement BAT. For example, the computing system can implement an application providing the features and functionality of BAT.

For example, system 100 can be used in a conflict setting in which biometric information can be used to distinguish friend from foe. As such, geographic Regions 102, 104, 106, and 108 can be located in the theater of conflict. Military personnel can desire to identity and track entities in the theater in order to distinguish friend and foe. Accordingly, the personnel in Regions 102, 104, 106, and 108 can use the computing systems with BAT to capture biometric information, such as fingerprints, iris prints, retinal prints, facial prints, handwriting samples, vein profiles, hand geometry, gait profiles, DNA samples, and voice samples in order to identify and track the entities. The personnel can use BAT to compare the biometric information to stored biometric information templates to identify the entities and classify them as friend for foe.

The personnel can also use BAT to share and retrieve biometric information from other geographic regions. This allows the personnel, for example, to identify personnel in real time at virtually any location and thereby identify and prevent foes from traveling region to region and creating mischief. Further, the personnel can use BAT to transmit the biometric information and retrieve biometric information from regions outside the theater of conflict such as Regions 110, 112, and 114.

System 100 above illustrates computing systems positioned and communicating in several configurations. One skilled in the art will realize that the configuration of the computing systems in system 100 is exemplary and that the computing systems can be arranged in various configurations according to local capability and need in order to communicate by various procedures.

For example, a single laptop computing system can be located in another geographic region. As such, data can be moved using removable and recordable media such as a USB drive or a CD-R instead of by direct network link. Additionally, for example, several laptops computing systems can be networked together, with one designated as the local "server."

Figure 2:
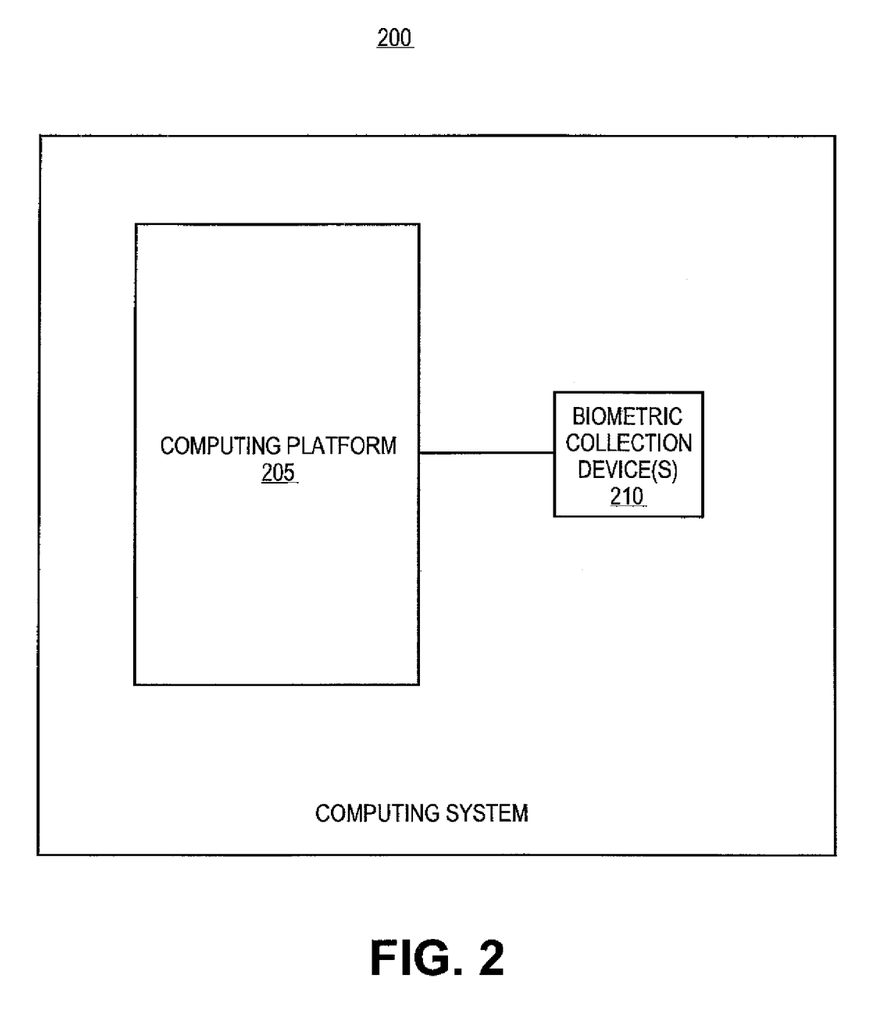
FIG. 2 is a diagram illustrating an exemplary computing system in the entity identification and tracking system.

As mentioned above, the computer systems of system 100 utilize BAT to capture, share, and analyze biometric information for identifying, recording, and tracking entities. FIG. 2 is a diagram of a computing system 200 that can be used as a computing system in system 100 to implement BAT for capturing, processing, and sharing of biometric information. As illustrated, computing system 200 can include a computing platform 205 and one or more biometric collection devices 210. One skilled in the art will realize that computing system 200 can include any additional hardware to allow the implementation of BAT for capturing, processing, and sharing biometric information.

Computing platform 205 can be any type of computing platform capable of implementing BAT. For example, computing platform 205 can include a processor (not shown), memory (not shown), busses (not shown), video hardware (not shown), sound hardware (not shown), networking hardware (not shown), communication hardware (not shown), and input output ports (not shown). One skilled in the art will realize that computing platform 205 can include any type of conventional computing hardware and software.

The processor can be, for example, a central processing unit (CPU), a micro-controller unit (MCU), digital signal processor (DSP), or the like. The memory can be a read only memory (ROM), a random access memory (RAM), or a memory with other access options. The memory can be physically implemented by computer-readable media, such as, for example; magnetic media, such as a hard disk, a floppy disk, or other magnetic disk, a tape, a cassette tape; optical media, such as optical disk (CD-ROM, DVD); semiconductor media, such as DRAM, SRAM, EPROM, EEPROM, or memory stick. Further, portions of the memory can be removable or non-removable.

Computing system 200 can also include one or more biometric collection devices 210. Biometric collection device 210 can collect biometric information such as fingerprint, iris, retinal, voice, vein, facial, hand geometry, DNA, gait, and handwriting information. One skilled in the art will realize that computing system 200 can include any number and types of biometric collection devices.

For example, biometric collection device 210 can be any fingerprint reader. The fingerprint reader can be permanently coupled to computing platform 205 or can be separate from computing platform 205, transported by a user, and connected to computing platform 205. The fingerprint reader can be an optical scanner or a capacitive scanner. An optical scanner would contain a charged-coupled device (CCD) for capturing an image of the fingerprint. A capacitive scanner would include semiconductor circuitry and conductor plates for detecting fingerprint detail.

Biometric collection device 210 can be connected to computing platform 205 through a PC card or other suitable peripheral connectors. Biometric collection device 210 can be physically attached to computing platform 205. Additionally, biometric collection device 210 can be integrated into computing platform 205 such that it is part of the housing of computing platform 205. Alternatively, biometric collection device 210 can be a separate device which can be carried by the user, Biometric collection device 210 can be powered by power supply of computing platform 205, either AC or DC power, or by its own internal power supply.

Biometric collection device(s) 210 can also comprise other devices for capturing biometric information such as facial images, fingerprint and palm images, iris images, retinal images, handwriting samples, vein profiles, hand geometry, gait profiles, DNA samples, and voice samples. For example, biometric collection devices 210 can include a camera. The camera can collect biometric information such as facial images, iris images, or retinal images. The camera can be selectively detachable from computing platform 205. The camera can be a video camera, a still image camera, or a combination of video or still camera.

The camera can be powered by power supply of computing platform 205, either AC or DC power, or by its own internal power supply. For example, the camera can be integrated with an expansion card to allow the camera to be connected to computing platform 205 directly at an expansion port. The camera can be integrated into computing platform 205 such that it is part of the housing of computing platform 205. Alternatively, the camera can be a separate device which can be carried by the user.

In order to facilitate the capturing, processing, and sharing of biometric information, implantations of BAT are designed to allow the computing systems in system 100 to operate in a client-server hierarchy. In the client-server hierarchy, the client can capture biometric information and forward the biometric information to the server for processing. The server can then perform analysis on the biometric information such as information matching and database updating. The server can also forward the information to and receive information from other computing systems in system 100.

For example, BAT can be implemented in a web application with the components to allow the computing systems in system 100 to function as web clients and web servers. The client can communicate with the server via a web browser using well-known protocols. The server implements BAT which hosts an interface for receiving and processing biometric information.

As mentioned above, BAT allows the computing systems of system 100 to function in a client-server hierarchy. According to embodiments of the present disclosure, BAT allows any computing system in system 100 to function as a client or a server. As such, the various computing systems in system 100 can interchange roles of client and server depending on certain factors in system 100, such as computing power, computing speed, usage, workload, or the like. To allow the dual functionality, implantations of BAT can include modules that allow the computing system to function as either a client or a server.

Figure 3:
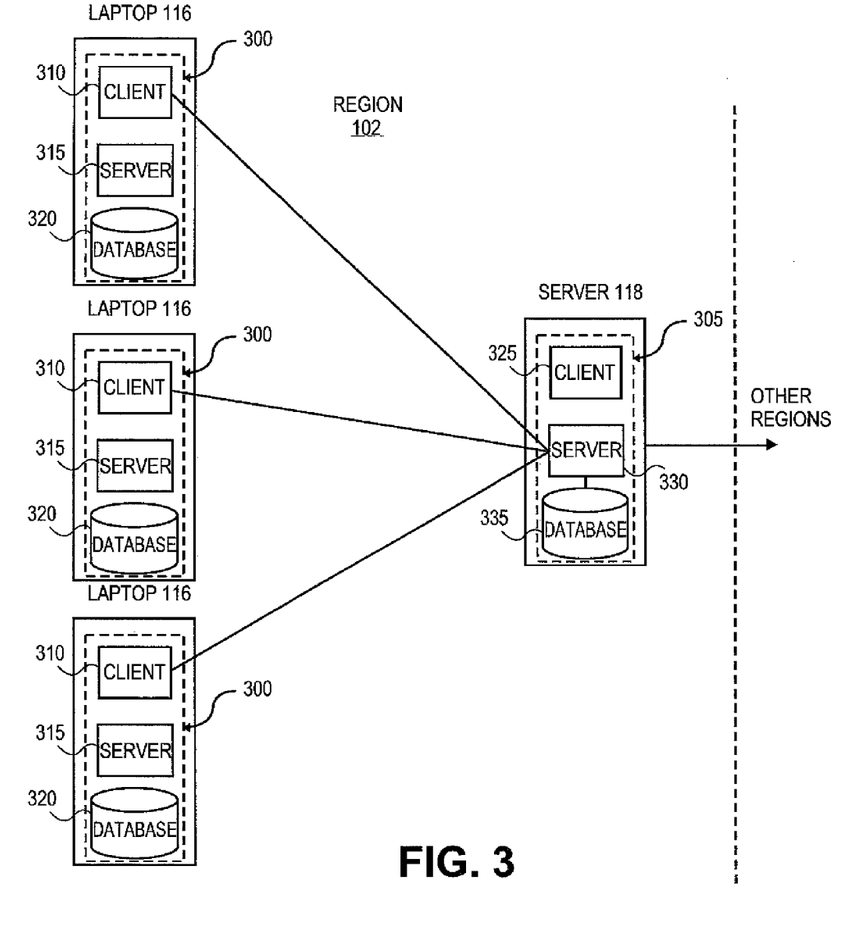
FIG. 3 is a diagram illustrating an exemplary client-server hierarchy in the entity identification and tracking system.

FIG. 3 is a diagram illustrating Region 102 of system 100 configured in an exemplary client-server hierarchy. It should be readily apparent to those of ordinary skill in the art that the diagram depicted in FIG. 3 represents a generalized schematic illustration and that other components may be added or existing components may be removed or modified.

As illustrated, laptop computing systems 116 can implement a BAT 300 and server computing system 118 can implement a BAT 305. BATs 300 can include a client module 310, a server module 315, and a database module 320. BAT 305 can include a client module 325, server module 330, and a database module 335. Client modules 310 and 325 allow user to interact with BAT to provide biometric information for processing. Server modules 315 and 330 can perform the functionality of BAT such as processing and matching of biometric information. Database modules 320 and 335 can store the biometric information for comparison and matching.

According to embodiments, either laptop computing systems 116 or server computing system 118 can be configured to function as either a client or server since BATs 300 and BAT 305 include client modules, server modules, and database modules. In the exemplary configuration, laptop computing systems 116 are configured to function as clients. As such, laptop computing systems 116 utilize client modules 310 to capture biometric information from entities and forward the information to server computing system 118.

In the exemplary configuration, server computing system 118 is configured to function as a server in the client-server hierarchy. As such, server computing system 118 can utilize server module 330 to receive the biometric information from laptop computing systems 116 and processes the biometric information. For example, server module 330 can match the biometric information to biometric templates stored in database 335 using components and methods described below. Server computing system 118 can communicate with other computing systems in other regions. For example, server computing system 118 can transmit or receive biometric information for other regions.

Additionally, a computing system, such as laptop computing systems 116, including a client module has the ability to connect to more than one server simultaneously, such as a server in other regions, and to submit biometrics and queries, and to access and modify information, from any or all of these servers.

FIG. 3 illustrates an exemplary configuration in which both laptop computing systems 116 and server computing system 118 can contain all the modules to function as either client or server. One skilled in the art will realize that either laptop computing systems 116 or server computing system 118 can contain less modules of BATs 300 or BAT 305. For example, client module 310 can only be installed on laptop computing systems 116, in a "light" or "thin" client system. In this case, server computing system 118 can include server module 330 and database 335 in order to operate BAT 305.

As mentioned above, BAT can be configured to run in either a client or server mode in a client-server hierarchy. According to embodiments, BAT can be implemented in an application which is executed by any computing system in system 100.

Figure 4:
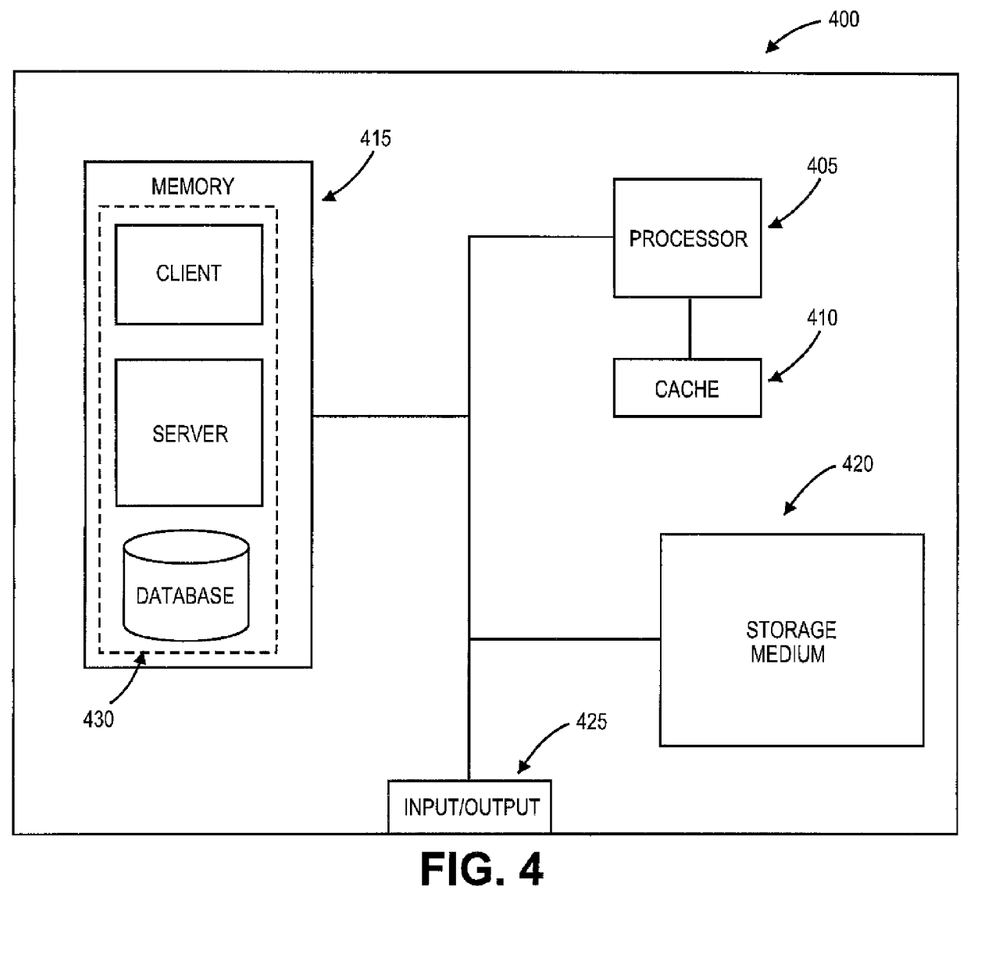
FIG. 4 is a diagram illustrating BAT implemented as an exemplary application in a computing system.

FIG. 4 is a diagram illustrating an exemplary configuration of a computing platform 400, such as computing platform 200 shown in FIG. 2, in which BAT is implanted as an application. As illustrated, computing platform 400 can include a processor 405, cache 410, memory 415, storage medium 420, and input/output 425. One skilled in the art will realize that the components of computing platform 400 are exemplary and computing platform 400 can include additional hardware such as the hardware described in FIG. 2.

BAT can be implemented as an application 430 executed by computing platform 400. As such, application 430 can be embodied on storage medium 420 or memory 415 (as illustrated) as instructions for causing computing platform 400 to perform the instructions. Storage medium 420 and memory 415 can include computer readable signals, in compressed or uncompressed form. Exemplary computer readable signals, whether modulated using a carrier or not, are signals that a computing system can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

Processor 405 provides an execution platform for BAT implemented in application 430 for performing biometric information capturing, processing, and sharing. Commands and data from processor 405 can be communicated over a communication bus to and from memory 415. Memory 415 can be, for example, a Random Access Memory (RAM). Memory 415 can store an operating system (OS) such as those from MICROSOFT®.

As illustrated, memory 415 can also store application 430, which can be executed during runtime by processor 405. As such, the various modules such as client, server, and database can be loaded into memory 415 depending on their particular role. As such, processor 405 can execute application 430 stored in memory 415 to perform the capturing, processing, storage, and sharing of biometric information. Application 430 can be written in program code and executed by computing platform 400. Application 430 can be implemented in computer languages such as PASCAL, C, C++, JAVA, HTML, XML and the like. One skilled in the art will realize that the components, functions, and methods described above and below can be implemented in any computer language and any application capable of implementing BAT.

As illustrated, application 430 can be stored in memory 415 during runtime. Additionally, a copy of application 430, whole or in part, can be stored in storage medium 420. For example, application 430 can be stored in storage medium 420 and, during runtime, application 430, whole or in part, can be loaded into memory 415. Storage medium 420 can be, for example, a hard disk drive and/or a removable storage drive, representing a floppy diskette drive, a magnetic tape drive, a compact disk drive, etc.

Figure 5:
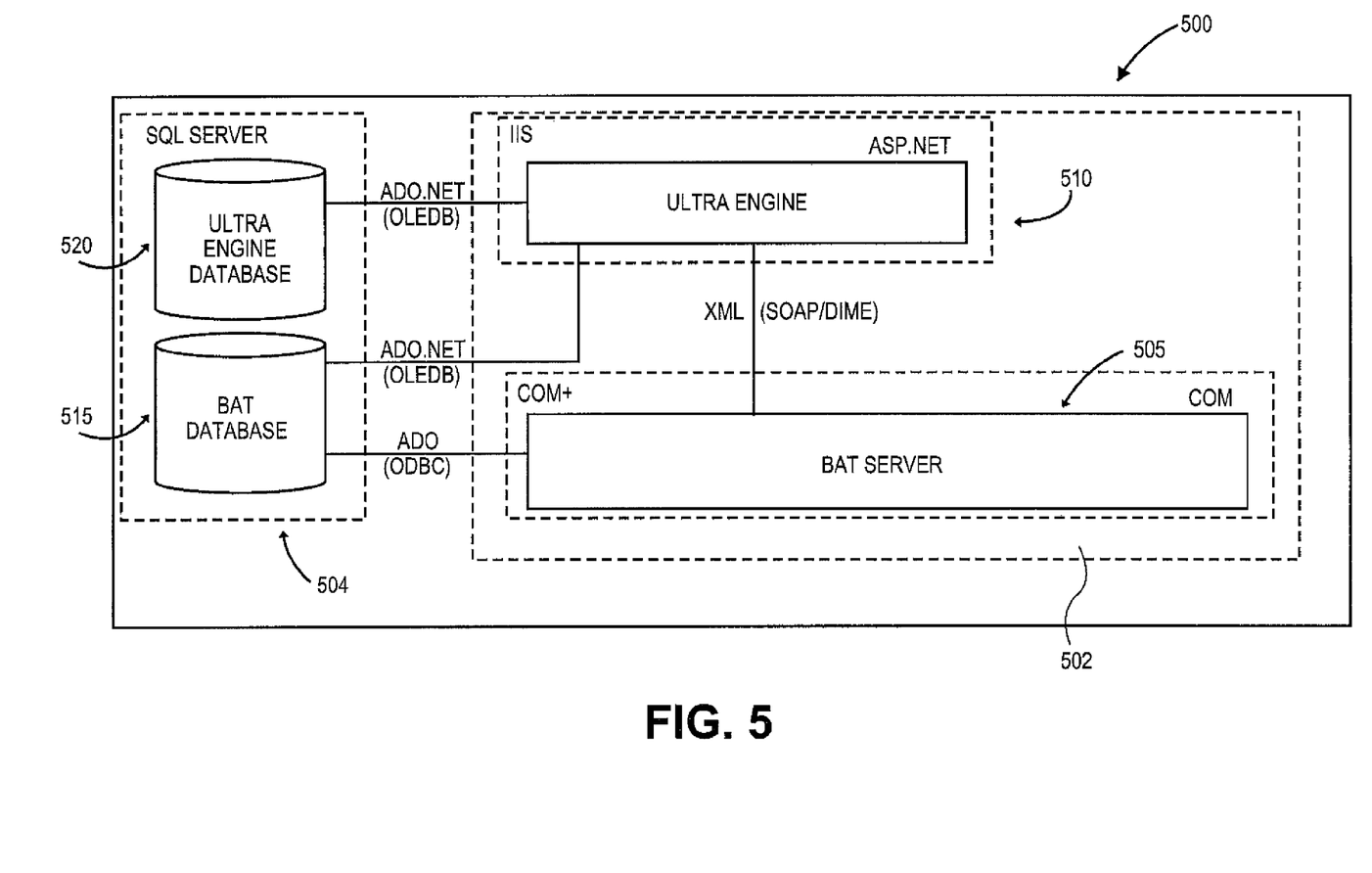
FIG. 5 is a diagram illustrating an exemplary server module in the BAT application.

As mentioned above, BAT is designed to capture and process biometric information and can be configured to function as either a client or server. FIG. 5 is a diagram illustrating a BAT application 500 configured to function as a server. It should be readily apparent to those of ordinary skill in the art that the diagram depicted in FIG. 5 represents a generalized schematic illustration and that other components may be added or existing components may be removed or modified.

As illustrated, application 500 can be configured to include a server module 502 and a database module 504. These modules can be implemented as software, firmware, or some combination of both, which can be executed on the computer systems in system 100. The software modules can be written in a variety of programming languages, such as Visual Basic, C, C++, Java, etc. Further, the components can use well-known software applications from companies such as MICROSOFT®.

Server module 502 can be configured to include a BAT server 505 and an UltraEngine 510. BAT server 505 can be a standard server application in a client-server environment. BAT server 505 can be configured to manage biometric information input and output from database 504 and UltraEngine 510. BAT server 505 can be configured to provide an interface for receiving biometric information to be processed. As such, BAT server 505 provides interface, access, and communication to UltraEngine 510. Such communications can be based on well-known protocols and programming languages, such as ASP, XML, SOAP, .NET, SQL, HTTP, TCP/IP and Java. Interfaces provided by BAT server 505 can be implemented using well-known Internet technologies, such as web pages, which are well known to those skilled in the art.

Database module 504 manages biometric information such as identity information and biometric templates. Database module 504 can be implemented as a standard database server such as a SQL server. Database module 504 can be implemented using well-known database technology, such as relational databases, or object oriented databases. Database module 504 can be configured to include two separate databases, a BAT Database 515 and an UltraEngine Database 520. UltraEngine Database 520 and BAT Database 515 can be used to store the biometric information captured by the computer systems and biometric templates previously captured.

Database module 504 stores the biometric information captured and used by system 100. The biometric information can be stored in any well-known format such as biometric templates. Additionally, the biometric templates can include a unique identification, such as a unique number, that uniquely identifies the biometric template in system 100. Database module 504 can include the entire biometric database or module 504 can include only a portion of the entire biometric database. The size of the database can depend on the particular computing system in which application 500 is implemented.

UltraEngine 510 receives and processes all types of biometric information. According to embodiments, UltraEngine 510 consolidates all types of biometric information processing in lieu of a separate component for each type of information such as fingerprint, iris, facial, voice, vein, hand geometry, gait, DNA, or handwriting. UltraEngine 510 contains an internal caching mechanism called an UltraCache (not shown). The UltraCache caches biometric templates from BAT database 515 for rapid retrieval and processing, such as biometric matching, by UltraEngine 510. Further, UltraEngine 510 streamlines the request for biometric matching in order to reduce processing time for matching.

By utilizing UltraEngine 510 with the UltraCache, the computing systems, including computing platforms, of system 100 are capable of performing quick, real-time biometric analysis without overwhelming the computing systems' processing, memory and I/O resources.

UltraEngine 510, for example, can be an ASP.NET 1.1 Web Application. In this example, communication between BAT Server 505 and UltraEngine 510 occurs via a Web Service (SOAP/DIME-XML) call. For example, UltraEngine 510 can be implanted in a client-server application such as Internet Information Services (IIS).

Figure 6:
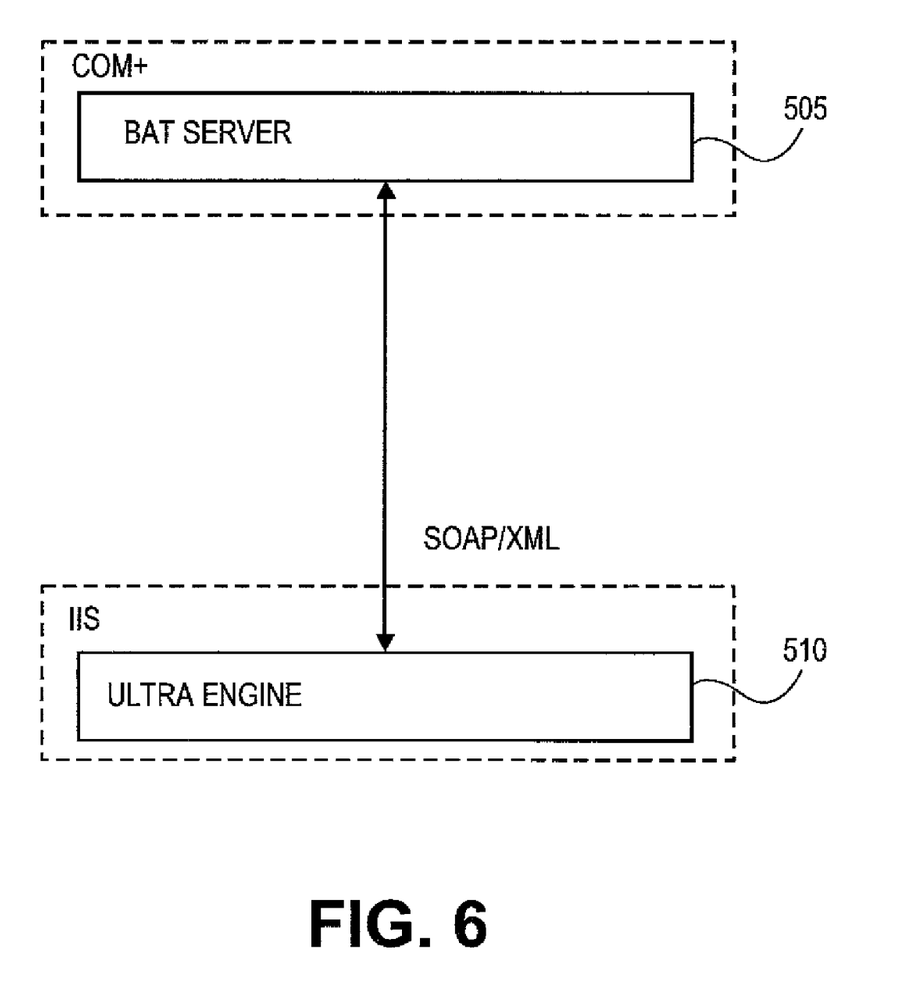
FIG. 6 is a diagram illustrating exemplary client-server calls of the server module.

FIG. 6 is a diagram illustrating exemplary client-server calls that can be used by application 500. As illustrated, calls from the BAT Server 505 are made on UltraEngine 510 using a SOAP/XML Web Services call. UltraEngine 510 uses "Enhanced Web Service" calls based on Microsoft's DIME standard. UltraEngine 510 can also use other XML/SOAP web service based extensions such as Message Transmission Optimization Mechanism (MTOM) or non-web service based protocols such as Microsoft .NET Remoting, Distributed COM (DCOM) or the Windows Communications Framework (WCF).

UltraEngine 510 can use UltraEngine database 520 to store configuration information and to store information related to the UltraCache. The UltraCache can be an inner component of UltraEngine 510 responsible for organizing and retrieving groups of biometric templates for UltraEngine 510 matching processes. Consequently, UltraEngine 510 can use the following system software: Microsoft IIS 5.5 or 6.0-Microsoft Web Services Enhancements (WSE) 3.0, Microsoft SOAP Toolkit 3.0, Microsoft .NET Framework 1.1, Microsoft SQL Server 2000 (MSDE, Personal, Standard or Enterprise).

As described above, UltraEngine 510 can be a module of application 500. Likewise, UltraEngine 510 can be a standalone application that can be configured to operate independently and communicate with other UltraEngine modules and BAT applications.

Figure 7:
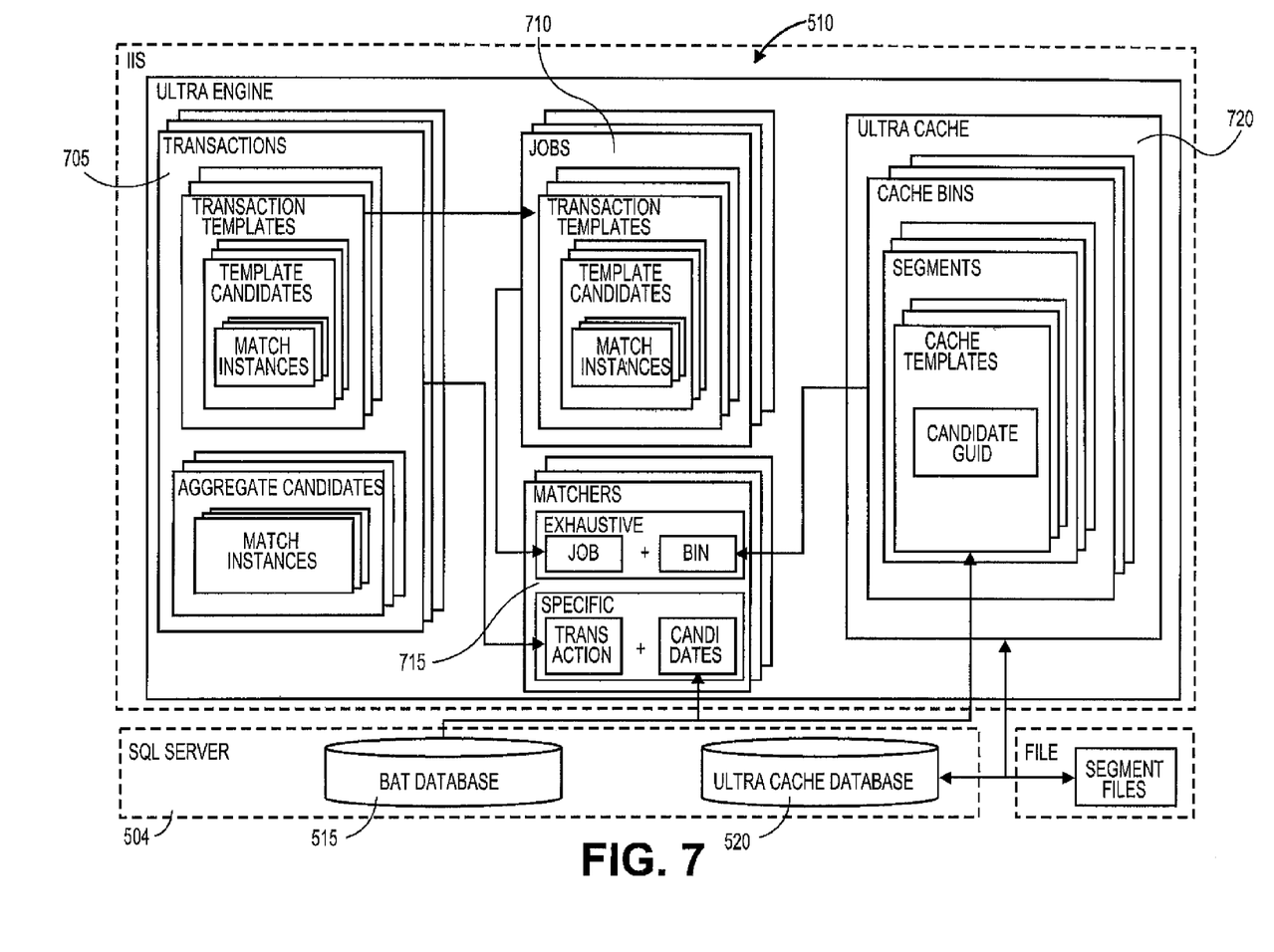
FIG. 7 is a diagram illustrating an exemplary UltraEngine of the BAT application.

FIG. 7 is a diagram illustrating an exemplary configuration of UltraEngine 510 consistent with embodiments of the present disclosure. UltraEngine 510 can process any type of biometric information such as fingerprint, facial recognition template, iris template, retinal template, voice print, vein profiles, hand geometry, gait profiles, DNA samples and handwriting sample. It should be readily apparent to those of ordinary skill in the art that the diagram depicted in FIG. 7 represents a generalized schematic illustration and that other components may be added or existing components may be removed or modified.

UltraEngine 510 can include four threads to perform the biometric processing; Transactions thread 705, Jobs thread 710, Matchers thread 715, and UltraCache 720. The four threads running in UltraEngine 510 handle the four primary sub-processes in UltraEngine 510: Jobs Management, Cache Updating, Transaction Management, and Matching including specific matching.

Transactions thread 705 can be configured to receive transactions for processing by UltraEngine 510. Transactions thread 705 can manage all transactions received in UltraEngine 510. Transactions thread 705 can determine whether the transactions should be passed to the Jobs thread 710 for jobs assignment. Further, Transactions thread 705 can also determine whether the transaction has already undergone candidate matching and can be passed to Matchers thread 715 for specific matching. Additionally, Transactions thread 705 can also determine whether the transaction includes aggregated candidates for specific matching.

Jobs thread 710 can be configured to break out the individual templates in the transactions and to assign them to Jobs. Jobs thread 710 can assign templates to Jobs based on the biometric template type and biometric features of the template. Each Job corresponds to a particular template Bin within UltraCache 720.

UltraCache 720 can be configured to cache biometric templates from BAT database 515 for rapid retrieval and processing by Matchers thread 715. UltraCache 720 can be configured to divide BAT database 515 biometric templates into Bins; each Bin represents one feature of a particular biometric type. Each Bin consists of one or more Segments. Each Segment includes one or more cached biometric templates.

For example, in fingerprint biometric information, each finger can be assigned a separate Bin. As such, an exemplary Bin can be "right-index finger". The right-index finger Bin would include Segments that contain right index finger templates from BAT database 515.

UltraCache 720 can include a Global Unique Identifier (GUID) of the cache. The GUID associates UltraCache 720 to the instance of UltraEngine 510 that creates UltraCache 720 and distinguishes UltraCache 720 from other UltraCaches.

UltraCache 720 can be configured to control updating the templates in UltraCache 720. UltraCache 720 can be configured to frequently update Bins with any new templates that can arrive in BAT Database 515. To achieve this, UltraEngine 510 can query BAT Database 515 for a count of any new templates that have arrived since a bracketed time period (all templates that arrived between the "last check time" and the "current check time"). If UltraEngine 510 determines that there are new templates, UltraEngine 510 adds the templates to UltraCache 720 (to the available Segment of its appropriate Bin).

Matchers thread 715 can be configured to initiate a group of Matchers. The Matchers can be configured to perform the exhaustive matching for the jobs and the specific matching. When the matcher makes a match, the Candidate information is stored such as the Global identifier of the Candidate, along with the Match Instance information (the confidence/score of the match or the like). The Matcher performs the matching by comparing the templates of the job to the templates in the segments of the corresponding Bin.

As UltraEngine 510 identifies candidates for a Transaction, UltraEngine 510 can perform specific matching of the candidates. UltraEngine 510 can perform parallel 1-to-1 matching on the database templates of each candidate, and depending on the match behavior of the transaction, can halt a transaction if UltraEngine 510 locates a "positive" match.

Matchers thread 715 can also perform specific matching without candidate matching. For example, transaction thread 705 can directly pass a transaction with candidate matches or aggregated candidates to Matchers thread 715. As such, the Matcher can perform specific matching between the template of the transaction and the candidate matches.

By utilizing UltraEngine 510 with UltraCache 720, the computing systems of system 100 are capable of performing quick, real-time biometric analysis without overwhelming the computing systems' processing, memory and I/O resources. For example, UltraEngine 510 with UltraCache 720 is available for matching as soon as UltraEngine 510 is started, without the need to perform a lengthy re-initialization each time.

Also, an UltraEngine regulates memory usage by rapidly loading caches as needed and discarding them from memory once matching against that segment is complete, resulting in the ability to match many more templates on a given system than can be held in volatile memory alone.

Additionally, the amount of biometric information that can be matched is limited only by non-volatile storage space (i.e. Hard Drive), not volatile memory (RAM). Additionally, since UltraCache 720 is not purged from memory, matching on an already initialized, UltraCache-persisted biometric information can begin almost immediately after the computer is powered up.

Additionally, by using UltraEngine 510 with UltraCache 720, multiple transactions can be processed in parallel because like templates from multiple different transactions can be added to the same Job and matched against the Bins and Segments simultaneously.

Additionally, UltraEngine 510 can be extended to incorporate other biometric matching algorithms and biometric modalities by adding new matchers to Matchers thread 715 around third-party biometric algorithms. An UltraEngine Matcher has a well-defined interface and code library structure. Matchers can be added or removed from UltraEngine 510 independent of each other, providing a flexible, scalable, extensible multimodal biometric match engine architecture.

Figure 8:
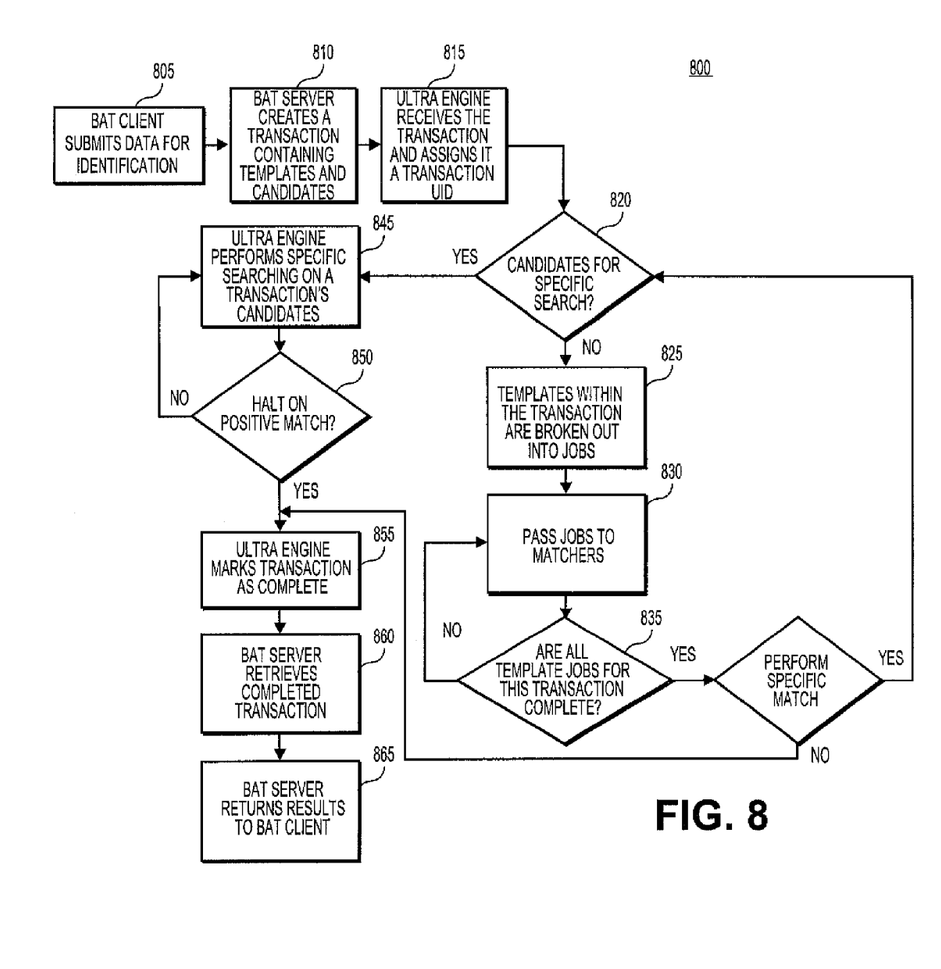
FIG. 8 is a diagram illustrating a process of biometric analysis performed by the UltraEngine.

FIG. 8 is a flow diagram illustrating a process 800 of analyzing biometric information consistent with embodiments of the present disclosure. The process can be performed by computing systems in system 100 implementing BAT application such as application 500 as described above in FIGS. 5 through 8. It should be readily apparent to those of ordinary skill in the art that the diagram depicted in FIG. 8 represents a generalized illustration and that other steps may be added or existing steps can be removed or modified.

Process 800 begins when a client submits identification data to BAT Server 505, in step 805. The client can submit the identification information via an interface, such as a web page or DCOM interface, generated by Bat Server 505. For example, the identification information can include one or more sample biometrics templates to be matched. The identification information can also include specific candidates with which to match the sample biometrics templates.

Then, BAT server 505 creates a Transaction including the identification information for processing by UltraEngine 510 and transmits the Transaction to UltraEngine 510, in step 810. BAT server 505 can create the Transaction in an XML form to submit to UltraEngine 510 for processing.

Once received by UltraEngine 510, UltraEngine 510 assigns a unique identification (UID) to the transaction, in step 815. The UID allows UltraEngine 510 to identify the particular transactions.

UltraEngine 510 determines if the transaction contains candidates for specific searching, in step 820. If the transaction does not have specific candidates, the UltraEngine 510 breaks out the individual templates in the Transaction and assigns them to Jobs, in step 825. For example, UltraEngine 510 assigns templates to jobs based on the template type and biometric features of the template. Each Job corresponds to a particular template Bin within UltraEngine 510 internal UltraCache 720. The Bin consists of one or more Segments, which in turn contain one or more cached biometric templates.

If the transaction contains specific candidates, UltraEngine 510 can perform specific searching on the transactions candidates, in steps 845 and 850. For example, the transaction can contain specific candidates to match with sample biometric templates. The specific candidates may have been generated by pervious matching performed by any BAT application or UltraEngine. Likewise, the specific candidate can be input by the client.

After the Job is formed, UltraEngine 510 passes the Jobs to the matcher, step 830. When a Matcher receives Jobs for a particular transaction, the Matcher proceeds to match the job's templates (from an inbound transaction) against the templates in the Bin until all the Jobs have been process, in step 835. When the matcher makes a match, the Candidate information, such as the Global identifier of the Candidate, along with the Match instance information (the confidence/score, etc.) is associated with the transaction.

After the candidate matching, UltraEngine 510 determines whether specific matching is to be performed, in step 840. If specific matching is to be performed, UltraEngine 510 proceeds to specific matching, in step 850. If specific matching is not to be performed, UltraEngine 510 proceed to step 855.

As UltraEngine 510 identifies candidates for a transaction, UltraEngine 510 can perform parallel 1-to-1 matching on the database templates of each candidate, in step 845. Depending on the match behavior of the transaction, UltraEngine 510 can halt a transaction if it locates a "positive" match, in step 850.

Once the transaction is complete (either full exhaustive matching or after halting on a positive match), UltraEngine 510 marks the transaction as complete, in step 855. After marked as complete, BAT Server 505 retrieves the completed transaction, in step 860. For example, BAT server 505 can retrieve the completed transaction in XML form. The transaction can contain all of the candidate and match information that BAT Server 505 requires in order to formulate a response back to the BAT Client. After the specific searching, UltraEngine 510 formulates a response with the results of the specific searching to return to the BAT client, in step 865.

In process 800, UltraEngine 510 is not required to perform a job it creates. Since each computing system in system 100 can include a BAT application, UltraEngine 510 can pass the Job to another computing system for processing. UltraEngine 510 can make this determination based on its and other computing systems available computing resources. The UltraEngine can scale up by using more computing system in system 100. The UltraEngine can scale out by passing Jobs to adjacent BAT applications.

In this configuration, the UltraEngine, for example UltraEngine 510, passing the Job can be called the master UltraEngine and the receiving UltraEngine can be called UltraEngine Nodes. Other computing systems in system 100 can serve as UltraEngine Nodes which can receive Jobs, Bins and Segments from the master UltraEngine.

The UltraEngine uses a drop-off, notify and pick-up mechanism to ensure that the rate of biometric matching is optimized. The master UltraEngine which receives the transaction can drop off a Job with an UltraEngine Node. The master UltraEngine polls a local status indicator which is set to Complete via a web service call from the UltraEngine Node once it has completed processing the Job. The master UltraEngine can then pick up the results of the Job and aggregate any candidates.

The master UltraEngine can be configured to specify how many Jobs an UltraEngine Node can simultaneously process. By specifying the Max Jobs (Maximum number of Jobs) that an UltraEngine node can process in parallel, it is possible to commit from 0 to n processors in an n-processor node to the UltraEngine. For example, the master UltraEngine can be configured to handle Max Jobs of 0 (meaning that it does no matching, aside from specific 1:1 matching) on its own platform. A worker UltraEngine Node running on a 4-processor computer can be set to Max Jobs of 3, so that at any one time the UltraEngine can only send it up to 3 concurrent Jobs.

Additionally, UltraEngine Nodes receiving Jobs for matching can add segments from a master UltraEngine to their own UltraCache, thereby increasing the efficiency of matching by reducing the number of segment files that has to be retrieved or sent from the master UltraEngine.

Further, a given template type (e.g. Right Index Finger templates from Company X's Match Algorithm) can be split into several "narrower" Bins by specifying a Bin Width Factor or other specific biometric "features" (e.g. the number of minutia points in a fingerprint). Jobs containing a given template can be run against several Bins, which allows the Jobs (and narrower Bins) to be farmed out to UltraEngine Nodes for parallel processing.

For example, a Right Index template was grouped by the minutia count (0-20 minutia in Right Index Bin 1, 21-40 in Right Index Bin 2, 41-60 in Right Index Bin 3, etc.). If a Right Index is submitted to the engine for matching, then a Job would be created to match the Right Index against Right Index Bin 1, a Job would be created to match the Right Index against Right Index Bin 2, etc. Each of these jobs could be farmed out to a different UltraEngine Node and run in parallel.

Once the UltraEngine Node completes the matching, the UltraEngine Node can return the Job to the master UltraEngine with the candidates. Then, the master UltraEngine can perform specific candidate matching. Additionally, the master UltraEngine can return the results to the client.

By allowing multiple processing, CPU utilization, even in a scaled-out scenario where jobs are dropped off at UltraEngine Node, is near 100% because of the efficiency of dropping off Jobs, running Jobs, signaling the completion of a Job, and picking up a Job.

Figure 9:
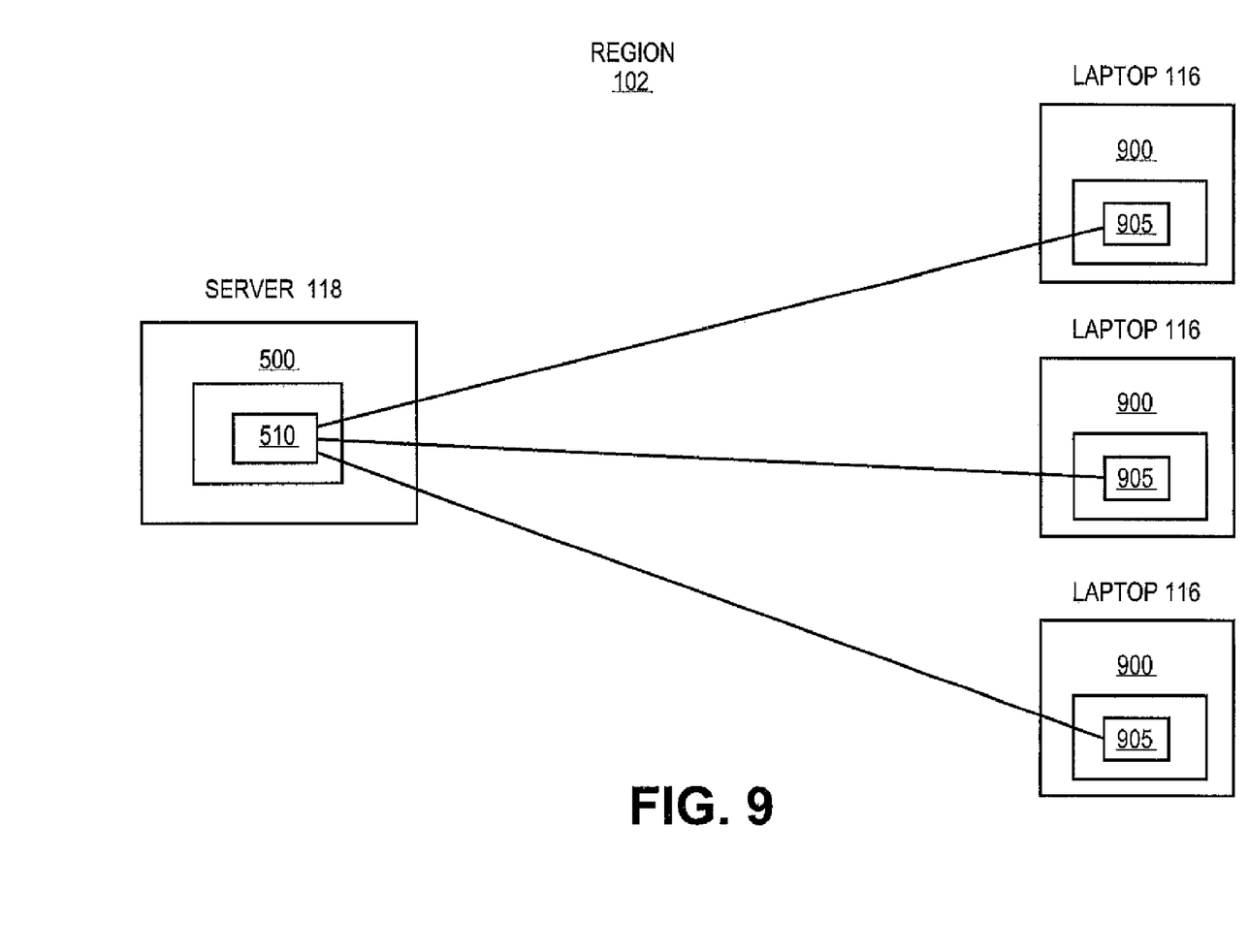
FIG. 9 is a diagram illustrating an UltraEngine sharing configuration.

Any computing systems in system 100 can cooperate together to share UltraEngine processing. FIG. 9 is a diagram of Region 102 configured to share UltraEngine processing. It should be readily apparent to those of ordinary skill in the art that the diagram depicted in FIG. 9 represents a generalized schematic illustration and that other components may be added or existing components may be removed or modified.

As illustrated, server computing system 118 can be configured to implement application 500 including UltraEngine 510. Laptop computing systems 116 can be configured to implement a BAT application 900 including UltraEngines 905. UltraEngine processing can be shared between UltraEngine 510 and Ultra Engines 905

For example, UltraEngine 510 can be established as the master UltraEngine and UltraEngines 905 can be established as UltraEngine Nodes. As such, UltraEngine 510 can pass Jobs to UltraEngines 905 for processing as mentioned above.

Figure 10:
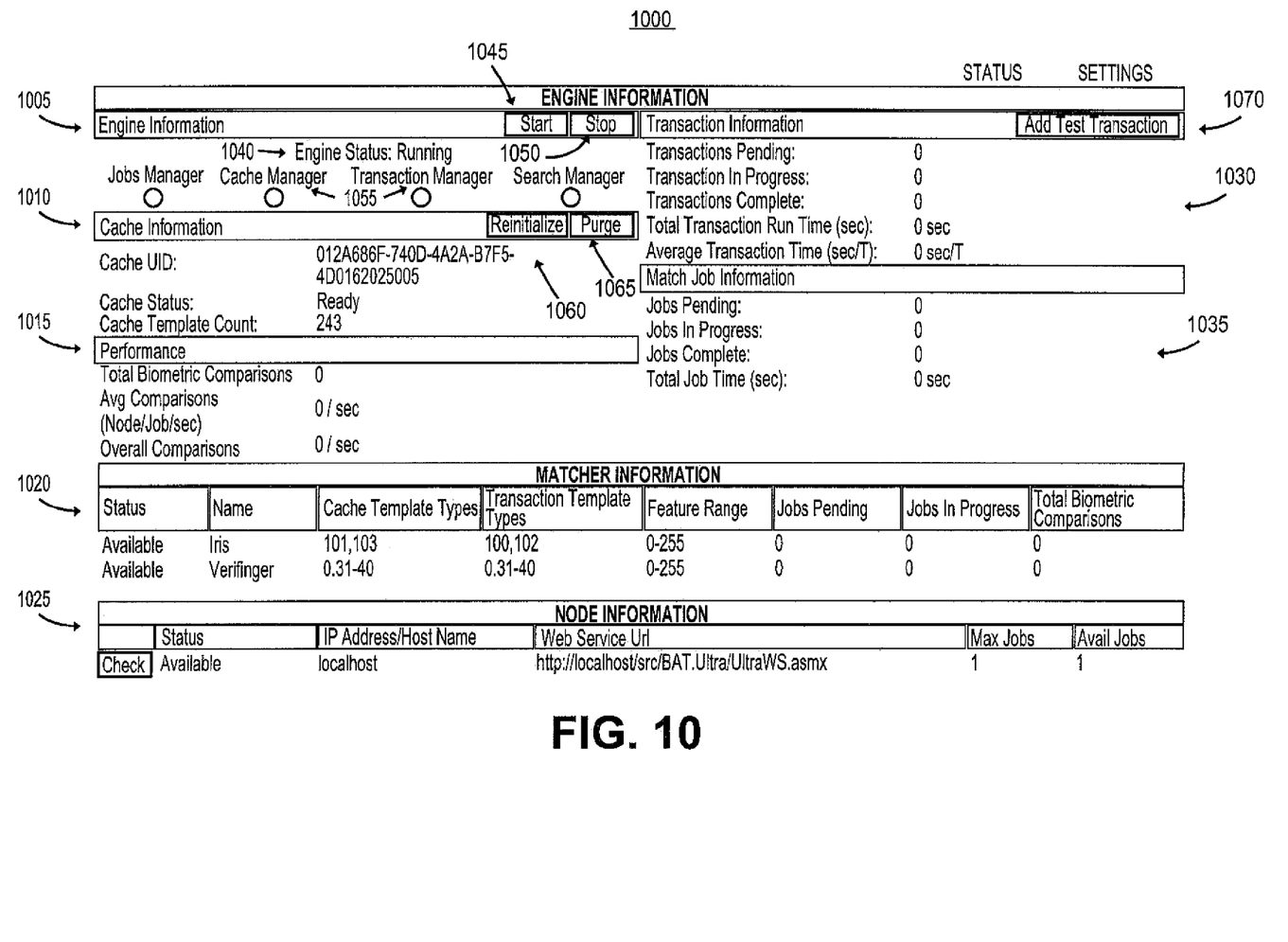
FIG. 10 is a diagram illustrating an exemplary UltraEngine status page.

The status of UltraEngine 510 can be checked by interacting with an interface generated by UltraEngine 510. For example, because UltraEngine 510 can be a Web Application, the status of UltraEngine 510 can be checked by navigating to an UltraEngine Status web page using a program such as Microsoft Internet Explorer. FIG. 10 is a diagram illustrating an exemplary UltraEngine Status page 1000 consistent with embodiments. UltraEngine Status page 1000 can provide information regarding the operation of UltraEngine 510.

UltraEngine Status page 1000 can shows statistics and status information for UltraEngine 510. UltraEngine Status page 1000 can include such fields as: Engine information 1005, cache information 10101 performance 1015, matcher information 1020, node information 1025, transaction information 10307 and match job information 1035.

Engine Information 1005 can include an Engine Status indicator 1040 that indicates one of three statuses: Running, Shutting Down and Stopped. Engine Information 1005 can include two command buttons, start button 1045 and stop button 1050, to allow UltraEngine 510 to be Stopped and Started.

Engine Information 1005 can include can include threads status fields 1055. Threads status field can include four colored balls to represent the status of the four internal threads of UltraEngine 510; Jobs Manager (responsible for assigning match jobs to the match engines); Cache Manager (responsible for checking BAT database 515 and periodically updating the Cache with new templates); Transaction Manager (responsible for checking the status of a submitted transaction to determine if the transaction is complete); and Search Manager (responsible for submitting transactions for specific searches against known candidates).

When UltraEngine 510 is running, all four color indicators should show Green. When UltraEngine 510 is shut down, all four color indicators should show Red. When UltraEngine 510 is initializing or shutting down, indicators can become red and others show green, as the processes start up or shut down in sequence. If one or more of the internal processes has failed, and shows red consistently while the others are green, then it can indicate an internal problem with UltraEngine 510.

Cache Information 1010 can indicate the Global Unique Identifier (GUID) of the UltraCache instance that is being utilized by UltraEngine 510. Each UltraCache has its own global unique identifier so that inner cache bins and cache bin segments can be tagged with the GUID of their parent cache. Cache Information 1010 can indicate the status of the Ultra-Cache. The UltraCache can be in one of three states: Empty, Updating, and Ready.

Cache Information 1010 can include two command buttons, Reinitialize button 1060 and Purge button 1065, to allow UltraEngine 510 to Reinitialize or Purge the UltraCache. If Reinitialize button 1060 is selected, UltraEngine 510 can first shut down. Then, the UltraCache can delete at cache bins and segments that belong to the local UltraCache instance. Finally, the UltraCache can reinitialize its bins and segments from the local database and the UltraEngine restarts.

If Purge button 1065 is selected, UltraEngine 510 can first shut down. Then, the UltraCache can delete all cache bins and segments that belong to any UltraCache instance. (Where operating in a master-node configuration, where a remote UltraEngine submits, job to the local UltraEngine, the local UltraEngine can have stored one or more cache segments belonging to another UltraEngine. Purge clears these as well as those belonging to the local UltraCache instance). Following a Purge, the UltraEngine 510 can remain stopped. UltraEngine 510 can be restarted by clicking Reinitialize button 1060.

Performance 1015 can provide metrics on the number of biometric comparisons made by UltraEngine 510 and any other UltraEngine Node.

Matcher Information 1020 can show the status of each individual biometric modality matchers that are plugged into UltraEngine 510. The status can include the template type indicators that a given matcher is responsible for, as well as the number of biometric comparisons that have been performed by that matcher. The status can include other performance metrics specific to the individual matcher.

Node Information 1025 can show the status of each of the individual UltraEngine Nodes that are available to perform matching. The status can include information on the master UltraEngine Node as well as any configured worker UltraEngine Nodes.

Transaction information 1030 can provide information on the transaction being processed by UltraEngine 510. Transaction information 1030 can include a test transaction button 1070 in order to place a test transaction in UltraEngine 510. Match job information 1035 provides information on job being processed by UltraEngine 510

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying persons based on biometric information, comprising:
    providing a cache of biometric templates, the cache storing segments of the biometric templates associated with biometric features contained in the segments;
    receiving a sample biometric template to be identified;
    dividing the sample biometric template into jobs based on the biometric features contained in the sample biometric template;
    comparing the jobs to the segments corresponding to the biometric features of the sample biometric template to determine candidate biometric templates associated with the segments that match the jobs; and
    generating a candidates list identifying the candidate biometric templates and entities related to the candidate biometric templates.

2. The method of claim 1, wherein the biometric templates comprise at least one of fingerprint templates, facial templates, voice templates, iris templates, vein templates, hand geometry templates, gait templates, DNA templates and handwriting templates.

3. The method of claim 1, wherein the jobs match the segments within a predetermined tolerance.

4. The method of claim 3, further comprising:
    comparing the candidate biometric templates to the sample biometric template to determine one biometric template of the candidate biometric templates that matches the sample biometric template.

5. The method of claim 1, further comprising:
    receiving predetermined biometric templates that match the sample biometric template; and
    comparing the predetermined biometric templates to the sample biometric template to determine one biometric template of the predetermined biometric templates that matches the sample biometric template.

6. The method of claim 1, further comprising:
    transmitting at least a first job of the jobs to a remote location for comparing the first job to the segments corresponding to the biometric features of the first job.

7. The method of claim 1, wherein dividing the sample biometric template comprises:
    combining the sample biometric template with additional sample biometric templates based on the biometric features of the sample biometric template.

8. An apparatus for identifying persons based on biometric information, comprising:
    a cache configured to store biometric templates, the cache storing segments of the biometric templates associated with biometric features contained in the segments;
    an interface configured to receive a sample biometric template to be identified;
    a jobs thread coupled to the interface, wherein the jobs thread is configured to divide the sample biometric template into jobs based on the biometric features contained in the sample biometric template; and
    a matchers thread coupled to the jobs thread, wherein the matchers thread is configured to compare the jobs to the segments corresponding to the biometric features of the sample biometric template to determine candidate biometric templates associated with the segments that match the jobs and configured to generate a candidates list identifying the candidate biometric templates and entities related to the candidate biometric templates.

9. The apparatus of claim 8, wherein the cache is further configured to store the biometric templates comprising at least one of fingerprint templates, facial templates, voice templates, iris templates, vein templates, hand geometry templates, gait templates, DNA templates, and handwriting templates.

10. The apparatus of claim 8, wherein the jobs thread is configured to match the jobs to the segments within a predetermined tolerance.

11. The apparatus of claim 10, wherein the matchers thread is further configured to compare the candidate biometric templates to the sample biometric template to determine one biometric template of the candidate biometric templates that matches the sample biometric template.

12. The apparatus of claim 8, wherein the interface is further configured to receive predetermined biometric templates that match the sample biometric template; and wherein the matchers thread is further configured to compare the predetermined biometric templates to the sample biometric template to determine one biometric template of the predetermined biometric templates that matches the sample biometric template.

13. The apparatus of claim 8, wherein the interface is further configured to transmit at least a first job of the jobs to a remote location for comparing the first job to the segments corresponding to the biometric features of the first job.

14. The apparatus of claim 8, wherein the jobs thread is further configured to combine the sample biometric template with additional sample biometric templates based on the biometric features of the sample biometric template.

15. A system for identifying persons based on biometric information, comprising:

a server configured to receive a sample biometric template to be identified over a network;

a database coupled to the server, wherein the database is configured to store biometric templates;

a biometric engine coupled to the server and database for identifying and managing the biometric information, the biometric engine comprising:

a cache configured to store segments of the biometric templates associated with biometric features contained in the segments;

an interface configured to receive the sample biometric template from the server;

a jobs thread coupled to the interface, wherein the jobs thread is configured to divide the sample biometric template into jobs based on the biometric features contained in the sample biometric template; and a matchers thread coupled to the jobs thread, wherein the matchers thread is configured to compare the jobs to the segments corresponding to the biometric features of the sample biometric template to determine candidate biometric templates associated with the segments that match the jobs and configured to generate a candidates list identifying the candidate biometric templates and entities related to the candidate biometric templates.

16. The system of claim 15, wherein the cache is further configured to store the segments of biometric templates comprising at least one of fingerprint templates, facial templates, voice templates, iris templates, vein templates, hand geometry templates, gait templates, DNA templates, and handwriting templates.

17. The system of claim 15, wherein the jobs thread is configured to match the jobs to the segments within a predetermined tolerance.

18. The system of claim 17, wherein the matchers thread is further configured to compare the candidate biometric templates to the sample biometric template to determine one biometric template of the candidate biometric templates that matches the sample biometric template.

19. The system of claim 15, wherein the interface is further configured to receive predetermined biometric templates that match the sample biometric template; and wherein the matchers thread is further configured to compare the predetermined biometric templates to the sample biometric template to determine one biometric template of the predetermined biometric templates that matches the sample biometric template.

20. The system of claim 15, wherein the interface is further configured to transmit at least a first job of the jobs to a remote biometric engine for comparing the first job to the segments corresponding to the biometric features of the first job.

21. The system of claim 15, wherein the jobs thread is further configured to combine the sample biometric template with additional sample biometric templates based on the biometric features of the sample biometric template.

* * * * *